(12) United States Patent
Tokumaru et al.

(10) Patent No.: US 7,098,579 B2
(45) Date of Patent: Aug. 29, 2006

(54) TRANSMITTING APPARATUS, SOUND SENSOR AND AUTONOMOUS TRAVELING VEHICLE

(75) Inventors: Tomoyoshi Tokumaru, Hirakata (JP); Tatsuya Hirose, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/045,144

(22) Filed: Jan. 31, 2005

(65) Prior Publication Data

US 2005/0231068 A1 Oct. 20, 2005

(30) Foreign Application Priority Data

Mar. 31, 2004 (JP) ............................. 2004-104391

(51) Int. Cl.
*H01L 41/08* (2006.01)
*H02N 2/00* (2006.01)
(52) U.S. Cl. ...................... 310/339; 310/319; 367/117; 367/118
(58) Field of Classification Search ................ 310/319, 310/311, 339; 367/99, 117, 118, 217
See application file for complete search history.

(56) References Cited

U.S. PATENT DOCUMENTS 4,782,550 A * 11/1988 Jacobs .......................... 15/320

FOREIGN PATENT DOCUMENTS

JP 10-290495 10/1998
JP 10290495 A * 10/1998

* cited by examiner

*Primary Examiner*—Darren Schuberg
*Assistant Examiner*—J. Aguirrechea
(74) *Attorney, Agent, or Firm*—McDermott Will & Emery LLP (57) ABSTRACT

A driving circuit of a transmitting apparatus drives a piezoelectric element in a frequency band different from a resonance frequency at which a vibration system including the piezoelectric element resonates the most strongly. A driving circuit of a sound sensor drives the piezoelectric element for transmitting or receiving an acoustic wave in a frequency band different from a resonance frequency at which a vibration system including the piezoelectric element resonates the most strongly. Such a transmitting apparatus is mounted as a transmitting apparatus of a sound sensor to thereby realize the sound sensor with a small measurement error. The sound sensor is adopted for traveling control and steering control of an autonomous traveling vehicle to thereby enable an autonomous traveling vehicle capable of stopping in the vicinity of an obstacle to be realized.

2 Claims, 7 Drawing Sheets

TRANSMITTING APPARATUS, SOUND SENSOR AND AUTONOMOUS TRAVELING VEHICLE

CROSS-REFERENCE TO RELATED APPLICATION

This non-provisional application claims priority under 35 U.S.C. §119(a) on Patent Application No. 2004-104391 filed in Japan on Mar. 31, 2004, the entire contents of which are hereby incorporated by reference.

BACKGROUND OF THE INVENTION

1. Field of the Invention

The invention relates to a transmitting apparatus and a sound sensor for obtaining information such as the presence/absence of a detection-target object with an acoustic wave, or a distance therefrom to the detection-target object, and further relates to an autonomous traveling vehicle equipped with such a sound sensor.

2. Description of Related Art

Conventionally, there has been known an ultrasonic sensor that transmits an ultrasonic wave to a detection-target object and, also, receives a reflected wave from the detection-target object to thereby measure a distance therefrom to the detection-target object on the basis of an elapsed time from a transmission start time point to a reception start time point.

As a kind of such an ultrasonic sensor, there has been known an ultrasonic sensor comprising a transmitting apparatus including: a transmitter which includes a piezoelectric element and transmits an ultrasonic wave; a driving circuit which drives the piezoelectric element; and an oscillation circuit which inputs an oscillation signal in a predetermined frequency band to the driving circuit, and a receiving apparatus including: a receiver which includes a piezoelectric element and receives an ultrasonic wave; a sensing circuit which senses an ultrasonic wave in a predetermined frequency band on the basis of an electric signal generated as determined by a vibration of the piezoelectric element caused by the action of the ultrasonic wave; and a signal processing unit which performs processing for obtaining information on a detection-target object on the basis of the electric signal (see, for example, Japanese Patent Application Laid-Open No. 10-290495 (1998)).

The transmitter of the ultrasonic sensor described above has a case in the shape of a hollow cylinder with a bottom working as a vibration plate, to the inner surface of which a piezoelectric element is adhered. The driving circuit of the same vibrates the piezoelectric element at a predetermined resonance frequency band by applying a voltage to the piezoelectric element on the basis of an oscillation signal from the oscillation circuit. The resonance frequency band by which the piezoelectric element is vibrated is regarded as a resonance frequency at which a vibration system including the piezoelectric element resonates the most strongly and in which an ultrasonic wave is transmitted with a large amplitude of the vibration plate in resonance.

The ultrasonic wave transmitted from the transmitter is reflected by a detection-target object and received by the receiver. The ultrasonic wave received by the receiver is converted to an electric signal and the electric signal is signal-processed at the signal processing unit to thereby determine a distance therefrom to the detection-target object.

A conventional ultrasonic sensor as mentioned above, as shown in timing charts of FIG. 1A to FIG. 1C, has a slow rise of acoustic pressure of a transmitted ultrasonic wave until a vibration system including the piezoelectric element resonates in a stable state from the time when a voltage is applied to the piezoelectric element, for which transition a time T1 elapsed.

Figures 1A, 1B:
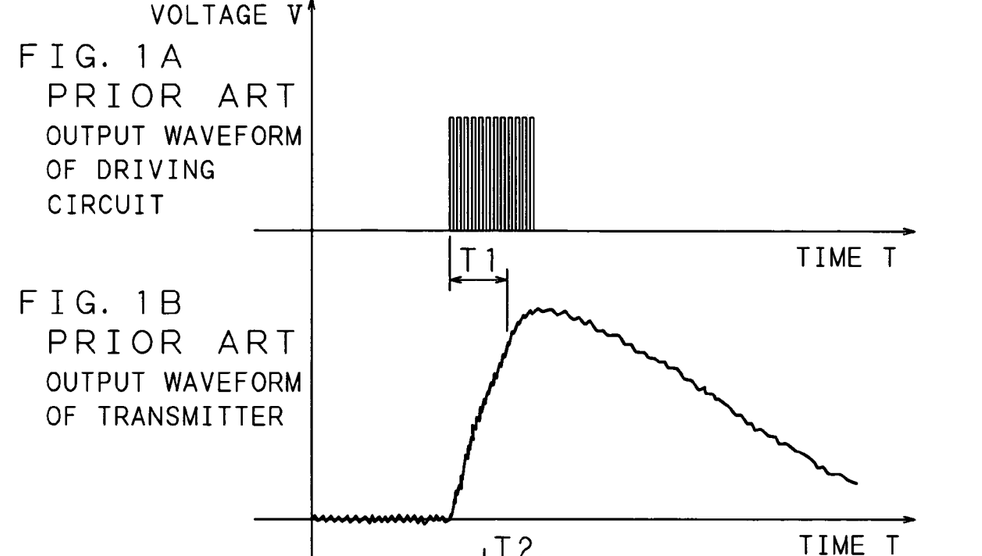
FIG. 1A, FIG. 1B and FIG. 1C are timing charts for illustrating operations of a conventional ultrasonic sensor.

To be concrete, the time T1 elapsed until the vibration system including the piezoelectric element resonates in a stable state, as shown in an output waveform of the transmitter of FIG. 1B, from the time when a voltage is applied to the transmitter, as shown in an output waveform of the driving circuit of FIG. 1A.

In a case where an ultrasonic wave with such a slow rise of acoustic pressure is received by the receiver, a time delay arises until the time when an acoustic pressure of the ultrasonic wave rises to a predetermined acoustic pressure from the time when the ultrasonic wave actually reaches the receiver. Since a configuration is such that determination on whether or not an ultrasonic wave has been received is performed by whether or not an electric signal obtained by converting an acoustic pressure of the received ultrasonic wave exceeds a predetermined threshold value, a measurement error arises as a time T2, shown in an input waveform of the receiver on FIG. 1C, elapsed until the input waveform exceeds a predetermined threshold value from the time when the ultrasonic wave starts to be received. The conventional sound sensor has had an unsolved problem that a measurement error, to be concrete, the time T2 shown in FIG. 1C, indispensably arises due to such a slow rise of acoustic pressure of an ultrasonic wave.

BRIEF SUMMARY OF THE INVENTION

Figure 1C:
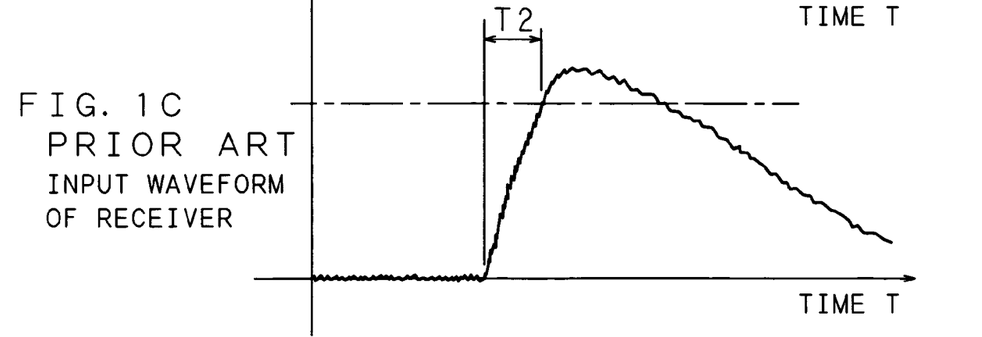

The present inventors conducted researches including experiments with serious efforts for the purpose of decreasing a measurement error revealed as a time T2 shown in FIG. 1C mentioned above. Through the research, the present inventors have found that a response time of a vibration system including a piezoelectric element is reduced in a case where a frequency which drives the piezoelectric element is set to a frequency different from a frequency at which the vibration system including the piezoelectric element resonates the most strongly, which is dissimilar to that in a conventional way, to thereby cause a steep rise of acoustic pressure of an ultrasonic wave transmitted by the vibration system, with the result that the time T2 shown in FIG. 1C can be greatly reduced, that is, the measurement error can be considerably reduced.

The invention has been made on the basis of the knowledge and findings mentioned above, and aims to provide a transmitting apparatus and a sound sensor capable of realizing a steep rise of sound pressure of an acoustic wave by adopting a configuration in which a piezoelectric element is driven in a frequency band different from a resonance frequency at which a vibration system including the piezoelectric element resonates the most strongly.

The invention also aims to provide a sound sensor having a small measurement error by adopting a configuration in which a piezoelectric element is driven in a frequency band different from a resonance frequency at which a vibration system including the piezoelectric element commonly used in transmission/reception of an acoustic wave resonates the most strongly.

The invention further aims to provide an autonomous traveling vehicle capable of stopping in the vicinity of, for example, a detection-target object by comprising the sound sensor.

A transmitting apparatus according to a first aspect of the invention is a transmitting apparatus comprising: a piezoelectric element; and a driving circuit for driving the piezoelectric element to transmit an acoustic wave; characterized in that the driving circuit drives the piezoelectric element in a frequency band different from a resonance frequency at which a vibration system including the piezoelectric element resonates the most strongly.

In the transmitting apparatus according to the first aspect of the invention, the driving circuit applies to the piezoelectric element a voltage that alters in a frequency band different from a resonance frequency at which a vibration system including the piezoelectric element resonates the most strongly. Since the piezoelectric element vibrates by applying a voltage from the driving circuit, an acoustic wave is transmitted. By driving the piezoelectric element in a frequency band different from a resonance frequency at which the vibration system including the piezoelectric element resonates the most strongly, a response time of the vibration system becomes shorter and a rise of acoustic pressure of an acoustic wave becomes steep as compared with a case where the piezoelectric element is driven in frequency at which the vibration system including the piezoelectric element resonates the most strongly.

A sound sensor according to a second aspect of the invention is a sound sensor comprising: a transmitting apparatus including a piezoelectric element, and a driving circuit for driving the piezoelectric element to transmit an acoustic wave; a receiving apparatus including a receiver for receiving a reflected wave, from a detection-target object, of an acoustic wave transmitted by the transmitting apparatus; and a processing circuit for acquiring information on the detection-target object on the basis of an elapsed time till the time when the receiver of the receiving apparatus receives the reflected wave from the time when the transmitting apparatus transmits an acoustic wave; characterized in that the driving circuit drives the piezoelectric element in a frequency band different from a resonance frequency at which a vibration system including the piezoelectric element resonates the most strongly.

In the sound sensor according to the second aspect of the invention, the driving circuit of the transmitting apparatus drives the piezoelectric element in a frequency band different from a resonance frequency at which the vibration system including the piezoelectric element resonates the most strongly to thereby transmit an acoustic wave from the transmitting apparatus. Since an elapsed time till the vibration system including the piezoelectric element resonates in a stable state becomes shorter than a case where the piezoelectric element is driven in a resonance frequency at which the vibration system including the piezoelectric element resonates the most strongly, a rise of acoustic pressure of a transmitted acoustic wave becomes steep. An acoustic wave reflected by a detection-target object is received by the receiving apparatus and converted to an electric signal, which is, for example, processed in order to detect a distance therefrom to the detection-target object.

An autonomous traveling vehicle according to a third aspect of the invention is an autonomous traveling vehicle characterized by comprising: a sound sensor, for detecting a detection-target object, including: a transmitting apparatus having an piezoelectric element and a driving circuit for driving the piezoelectric element in a frequency band different from a resonance frequency at which a vibration system including the piezoelectric element resonates the most strongly to transmit an acoustic wave; and a receiving apparatus having a receiver for receiving a reflected wave from the detection-target object of an acoustic wave transmitted from the transmitting apparatus; a processing circuit for acquiring information on the detection-target object on the basis of an elapsed time till the time when the receiver of the receiving apparatus receives the reflected wave from the time when the transmitting apparatus transmits an acoustic wave; and a control circuit for performing traveling control and steering control on the basis of information on the detection-target object acquired by the processing circuit.

In the autonomous traveling vehicle according to the third aspect of the invention, the autonomous traveling vehicle transmits an acoustic wave from the transmitting apparatus and receives the acoustic wave reflected by a detection-target object with the receiving apparatus. The received acoustic wave is converted to an electric signal and then processed, for example, to measure a distance therefrom to the detection-target object. The distance to the measured detection-target object is processed as one of control information for controlling autonomous traveling.

An autonomous traveling vehicle according to a fourth aspect of the invention is, in the third aspect, characterized by having a function as a cleaner, and characterized in that the traveling control and steering control by the control circuit is performed so as to travel on routes, in parallel with one pair of walls of a rectangular room facing and in parallel to each other, at predetermined intervals between adjacent routes in a direction along the other pair of walls facing and in parallel to each other, in a zigzag pattern.

In the autonomous traveling vehicle according to the fourth aspect of the invention, since the autonomous traveling vehicle according to the third aspect of the invention has a function as a cleaner, the autonomous traveling vehicle travels on routes along one pair of walls of a rectangular room facing and in parallel to each other, so as to travel forward on one route and then backward on the next route to thereby perform cleaning.

According to the transmitting apparatus of the first aspect of the invention, a response time becomes shorter, a rise of acoustic pressure of an acoustic wave becomes steep, so that a measurement error generated in an input waveform of the receiver becomes smaller as compared with a case where the piezoelectric element is driven in a resonance frequency at which the vibration system including the piezoelectric element resonates the most strongly.

According to the sound sensor of the second aspect of the invention, since an elapsed time until an acoustic pressure of an acoustic wave received by the receiving apparatus takes a predetermined value from the time when the acoustic wave reaches the receiving apparatus becomes shorter, an elapsed time until the acoustic wave actually exceeds a threshold value for use in determination of having detected from the time when the acoustic wave actually reaches the receiving apparatus becomes shorter, which makes a measurement error smaller.

According to the autonomous traveling vehicle of the third aspect of the invention, since a measurement error of the sound sensor becomes smaller to thereby enable a distance therefrom to the detection-target object with a high accuracy, an event in which the vehicle collides with the detection-target object because of a delay in control for stoppage is prevented from occurring.

According to the autonomous traveling vehicle of the fourth aspect of the invention, since the autonomous traveling vehicle of the third aspect of the invention, in a case where being configured as a cleaner, can perform cleaning a rectangular room while traveling routes along one pair of walls of the rectangular room facing and in parallel to each other, so as to travel forward on one route and then backward on the next route, the floor surface of the room is cleaned at every part thereof to thereby enable portions near walls where dust is easy to be gathered in the room to be cleaned with certainty.

The above and further objects and features of the invention will more fully be apparent from the following detailed description with accompanying drawings.

DETAILED DESCRIPTION OF THE PREFERRED EMBODIMENTS

Figure 2:
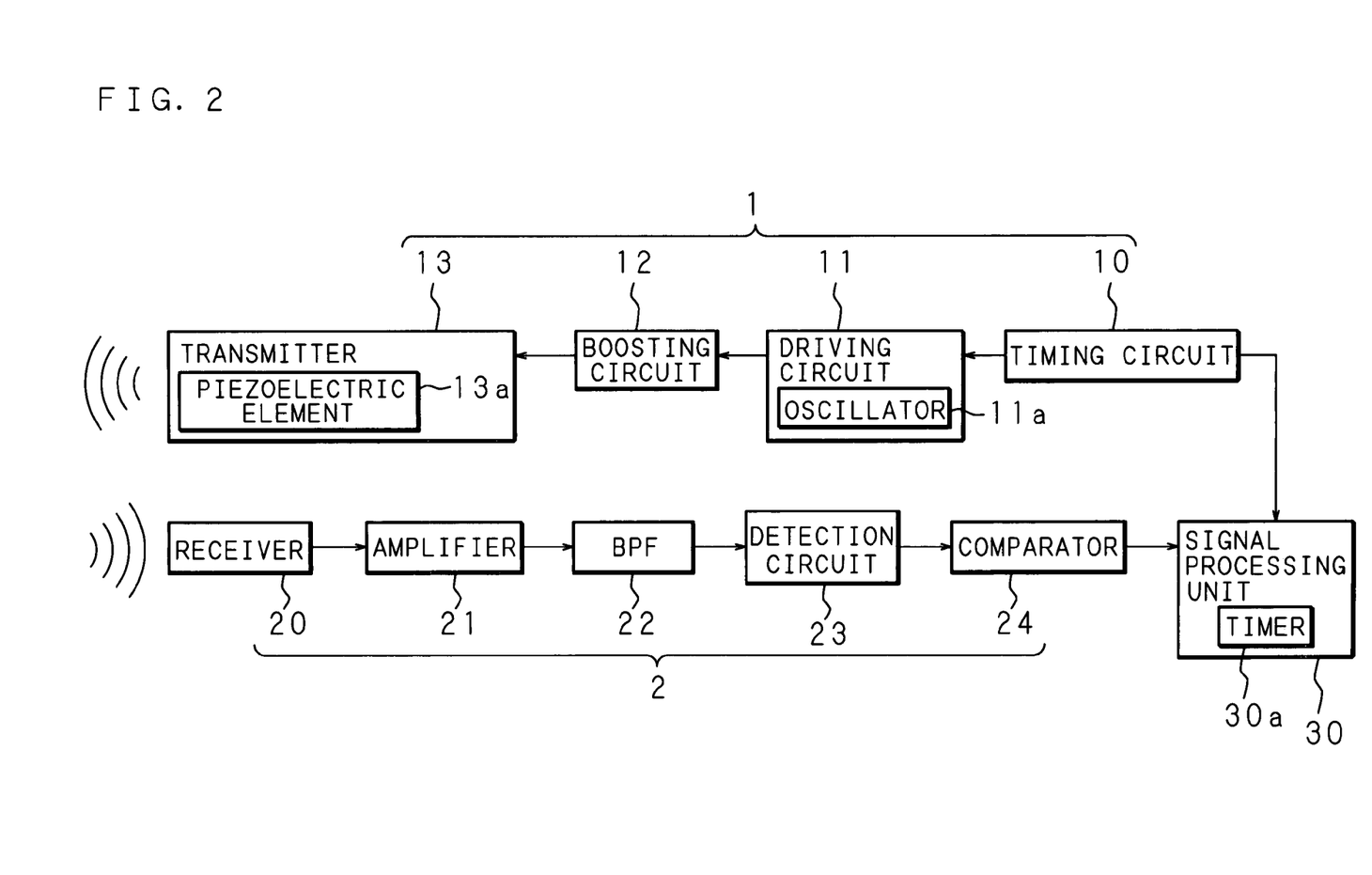
FIG. 2 is a block diagram showing a schematic configuration of a first embodiment of an ultrasonic sensor according to the invention.

Detailed description will be given of the invention below on the basis of the accompanying drawings showing preferred embodiments thereof. FIG. 2 is a block diagram showing a schematic configuration of a first embodiment of an ultrasonic sensor according to the invention.

An ultrasonic sensor according to the invention, as shown in FIG. 2, is, roughly speaking, constituted of a transmitting apparatus 1 according to the invention and a receiving apparatus 2 and further includes a signal processing unit 30. Such a ultrasonic sensor according to the invention is basically configured so that an acoustic wave is transmitted from the transmitting apparatus 1, the acoustic wave reflected by a detection-target object is received by the receiving apparatus 2, whereby a distance therefrom to the detection-target object is detected on the basis of an elapsed time until a reception time point from a transmission time point of the acoustic wave.

The transmitting apparatus 1 comprises a timing circuit 10, a driving circuit 11, a boosting circuit 12 and a transmitter 13. The timing circuit 10 outputs a trigger signal to the driving circuit 11 at predetermined intervals. The driving circuit 11 includes a built-in oscillator 11a, and outputs an oscillation signal of a frequency "f", which is outputted by the oscillator 11a, in synchronism with the trigger signal given from the timing circuit 10 to the boosting circuit 12 only for a predetermined time width. The boosting circuit 12 boosts a voltage of the oscillation signal given from the driving circuit 11 and outputs to the transmitter 13. The transmitter 13 applies the voltage boosted by the boosting circuit 12 to a built-in piezoelectric element 13a. The piezoelectric element 13a vibrates corresponding to the frequency "f" of the applied voltage and transmits an acoustic wave.

Figure 3:
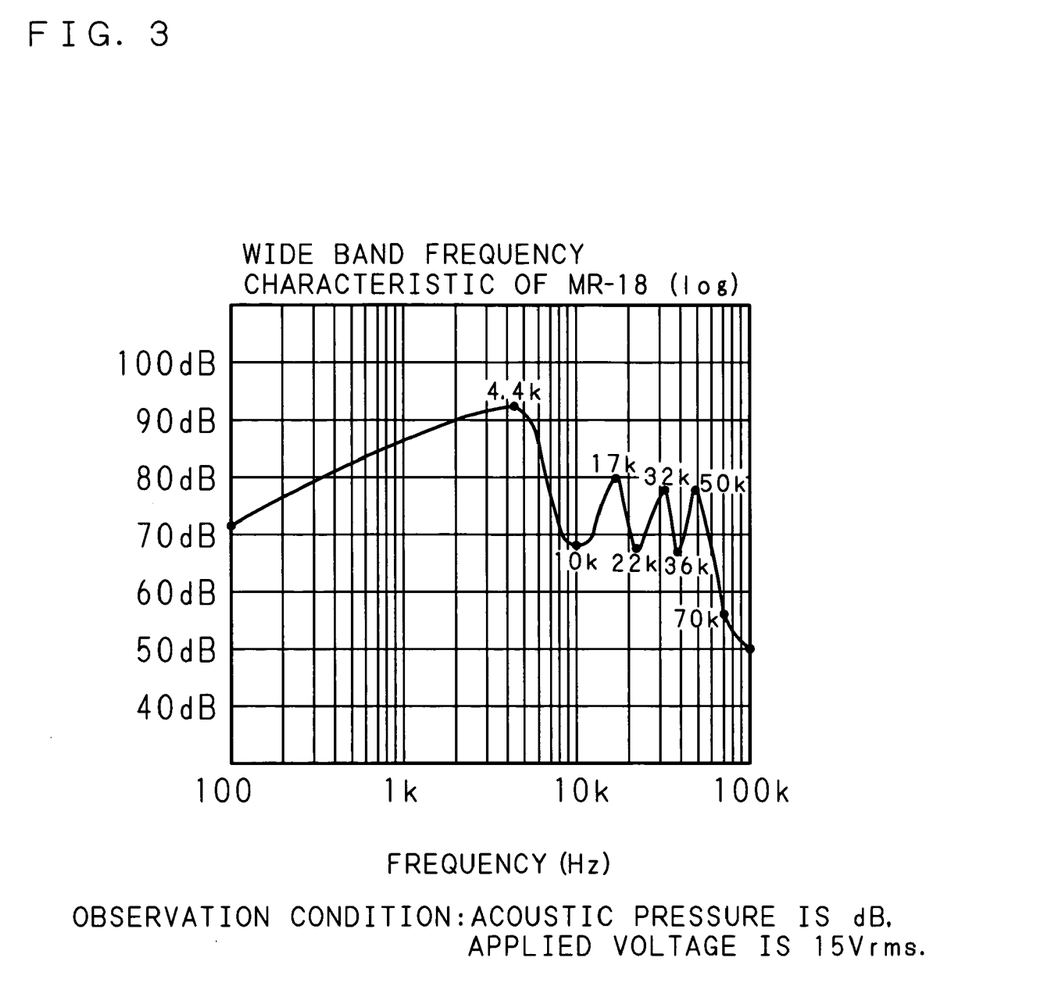
FIG. 3 is a graph showing a relationship between an acoustic pressure and a frequency of an acoustic wave transmitted from a transmitter.

Note that in the first embodiment, the transmitter 13 in use was a piezoelectric buzzer (MR-18) manufactured by NIHON CERATEC CO., LTD. FIG. 3 is a graph showing a relationship between an acoustic pressure and a frequency of an acoustic wave transmitted by the transmitter 13.

The transmitter 13 is, as shown in FIG. 3, configured so as to enable an acoustic wave of a frequency in the range from near 100 Hz to near 100 kHz to be transmitted. In the conventional technology, a transmitter for driving a piezoelectric element in a resonance frequency band is configured so as to have a sharp frequency characteristic such that an acoustic pressure is attenuated by 20 dB or more in frequency bands outside a range ±5 kHz of a resonance frequency at which an acoustic pressure is maximized. In the first embodiment of the invention, however, the transmitter 13 has, as shown in FIG. 3, frequency bands smaller in acoustic pressure by 10 and a few dB outside a range ±5 kHz of a resonance frequency (4.4 kHz) at which an acoustic pressure is maximized by the strongest resonance of a vibration system including the piezoelectric element 13a. The transmitter 13, as shown in FIG. 3, further has frequency bands in each of which an acoustic pressure becomes larger at about 17 kHz, about 32 kHz and about 50 kHz. The magnitudes of each acoustic pressure are only to be larger by 10 and a few dB than the surrounding frequency bands; therefore, the transmitter 13 of the invention is configured so as to have a more gently-sloping frequency characteristic, as compared with a transmitter in the conventional technology in which a piezoelectric element is driven in a resonance frequency band.

A value of a frequency "f" of an oscillation signal outputted from the oscillator 11a is set to a frequency different from a resonance frequency at which the vibration system including the piezoelectric element 13a resonates the most strongly and, to be concrete, set to a frequency in the vicinity of 50 kHz.

The receiving apparatus 2 includes a receiver 20, an amplifier 21, a band pass filter (BPF) 22, a detection circuit 23 and a comparator 24. An acoustic wave transmitted from the transmitter 13 of the transmitting apparatus 1 is reflected by the detection-target object and the reflected acoustic wave is received by the receiver 20 of the receiving apparatus 2. In the first embodiment, the receiver 20 in use was a condenser microphone (KUB4223) manufactured by Hoshiden Corporation.

The receiver 20 can receive an acoustic wave including from the audible region on to the ultrasonic wave region (in the vicinity of 100 kHz) to convert the acoustic wave into an electric signal. Therefore, the receiver 20 is configured so as to receive an acoustic wave transmitted from the transmitter 13 and reflected by the detection-target object and to convert the received acoustic wave into an electric signal.

The amplifier 21 is connected to the receiver 20. An electric signal, from the receiver 20, amplified by the amplifier 21 is inputted to the detection circuit 23 after passing through the BPF 22 through which a signal of a frequency in the vicinity of 50 kHz passes. An output from the detection circuit 23 is inputted to the comparator 24. The comparator 24 is configured so as to compare the electric signal inputted from the detection circuit 23 with a predetermined threshold value and to output a pulse signal as a timing stop signal to the signal processing unit 30 when the electric signal exceeds the predetermined threshold value.

The signal processing unit 30 is equipped with a timer 30a, and a trigger signal outputted by the timing circuit 10 is inputted as a timing start signal thereto. The signal processing unit 30 measures an elapsed time till the pulse signal outputted as the timing stop signal by the comparator 24 is inputted thereto from the time when the timing start signal (the trigger signal) is inputted thereto. The signal processing circuit 30 multiplies a time as a result of the measurement by a propagation velocity of an acoustic wave in a propagation medium to thereby calculate a distance to the detection-target object and output the calculated distance.

As described above, in the transmitting apparatus 1 according to the invention, the driving circuit 11 is configured so as to drive the piezoelectric element 13a in a frequency band (in the vicinity of 50 kHz) different from a resonance frequency (in the vicinity of 4.4 kHz) at which the vibration system including the piezoelectric element 13a resonates the most strongly. Hence, the time T3 until the vibration system including the piezoelectric element 13a resonates in a stable state, as shown in timing charts of FIG. 4A and FIG. 4B, becomes shorter and a rise of acoustic pressure of a transmitted acoustic wave becomes steep, compared with a case where the piezoelectric element 13a is driven in a frequency (in the vicinity of 4.4 kHz) at which the vibration system including the piezoelectric element 13a resonates the most strongly.

Figure 4A:
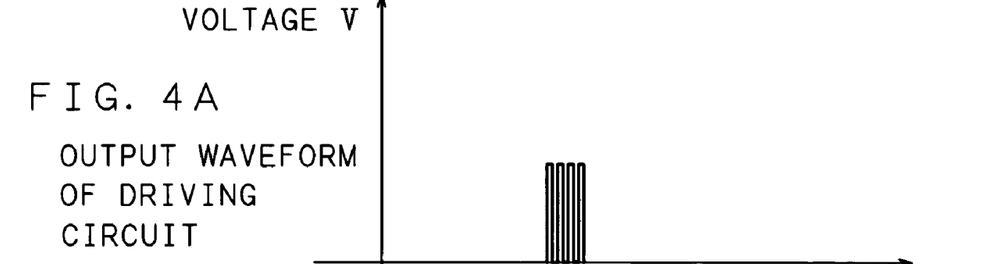
FIG. 4A, FIG. 4B and FIG. 4C are timing charts for illustrating operations of an ultrasonic sensor according to the invention.
Figure 4B:
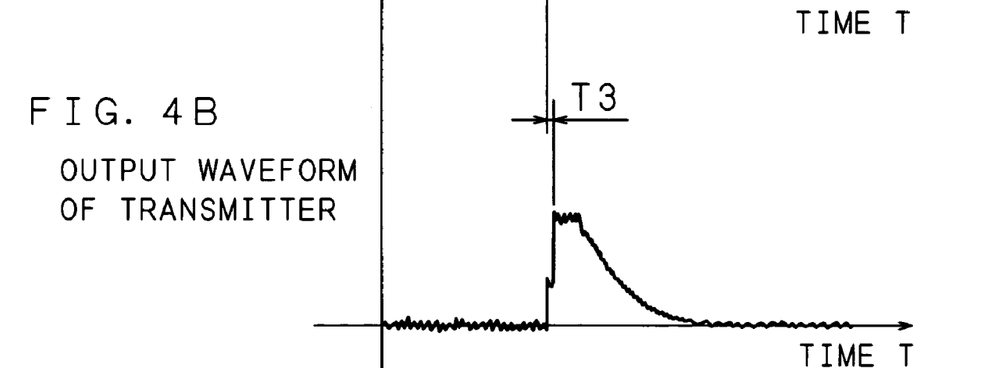
Figure 4C:
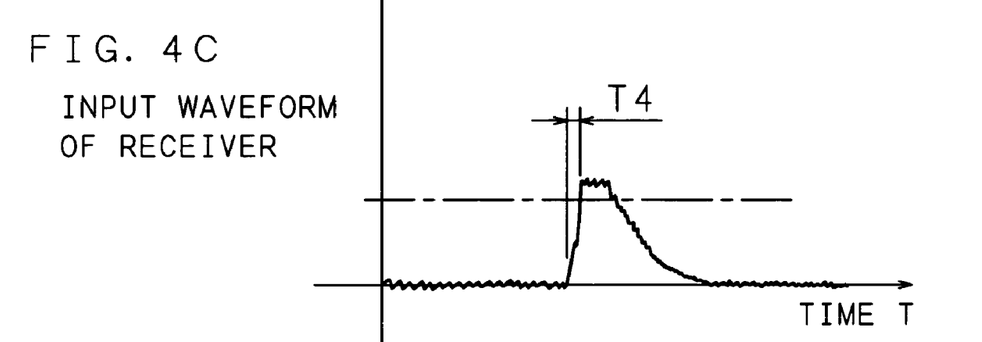

To be concrete, the time T3 elapsed until the vibration system including the piezoelectric element 13a resonates in a stable state as shown in an output waveform of the transmitter 13 of FIG. 4B from the time when a voltage is applied to the transmitter 13 as shown in an output waveform of the driving circuit 11 of FIG. 4A is very much shorter, as compared with the time T1 in the conventional technology shown in FIG. 1B.

In an ultrasonic sensor according to the invention, since an acoustic wave whose acoustic pressure rises steeply as mentioned above is transmitted and received by the receiver 20, a time T4 elapsed until the electric signal converted in the receiver 20, as shown in FIG. 1C, exceeds a predetermined threshold value is very much shorter as compared with a case of the conventional technology; therefore, an error in measurement of a distance of the detection-target object becomes smaller.

Note that while in the above first embodiment, a value of a frequency "f" of an oscillation signal outputted from the oscillator 11a is set to a value in the vicinity of 50 kHz, no limitation is required to be placed on the frequency "f". A value of the frequency "f" of an oscillation signal outputted from the oscillator 11a has only to be set in a frequency band different from a resonance frequency at which the vibration system including the piezoelectric element 13a resonates the most strongly.

In the first embodiment, a condenser microphone is used as the receiver 20, on which no specific limitation is placed. For example, a configuration is also possible in which, for example, a piezoelectric element is used instead of the condenser microphone and an electric signal is generated according to a vibration of the piezoelectric element by the action of the received acoustic wave.

Another configuration may also be allowed in which a horn is mounted to the transmitter 13 to thereby enable a directional characteristic of an acoustic wave transmitted from the transmitter 13 to be adjusted.

Figure 5:
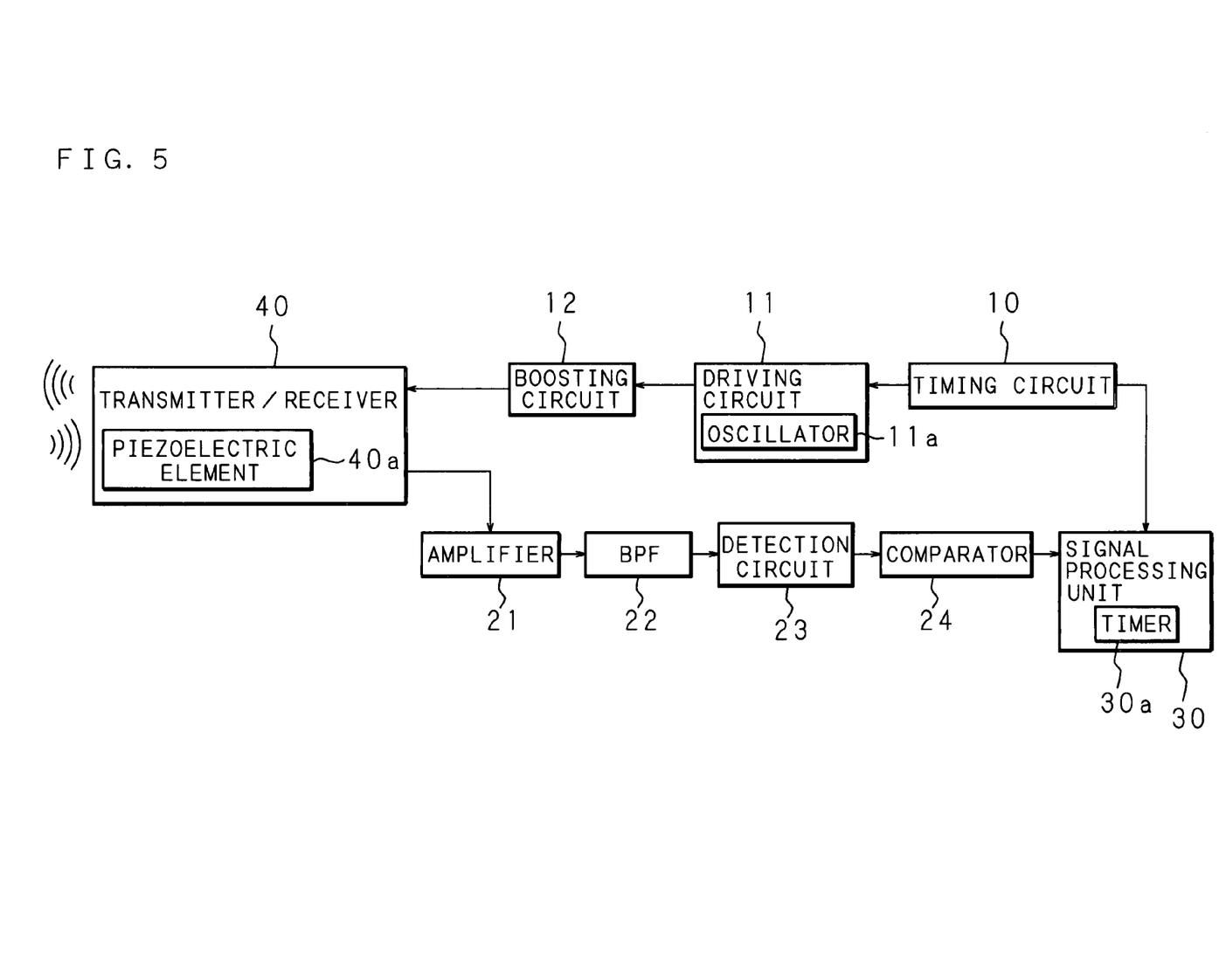
FIG. 5 is a block diagram showing a schematic configuration of an ultrasonic sensor of a second embodiment.

FIG. 5 is a block diagram showing a schematic configuration of a second embodiment of a ultrasonic sensor according to the invention.

In FIG. 5, numeral 40 denotes a transmitter/receiver, which is equipped with a piezoelectric element 40a. The piezoelectric element 40a is applied with a voltage outputted from a boosting circuit 12 according to an oscillation signal of a frequency "f" outputted from an oscillator 11a of a driving circuit 11. The piezoelectric element 40a vibrates according to the frequency "f" of the applied voltage given from the boosting circuit 12 and transmits an acoustic wave.

The transmitter/receiver 40 receives an acoustic wave reflected by a detection-target object to generate an electric signal according to the vibration of the piezoelectric element 40a by the action of the received acoustic wave. The generated electric signal is inputted to the detection circuit 23 through an amplifier 21 and a BPF 22 in a similar way to that in the case of the above mentioned first embodiment.

Since the other configuration and operations are similar to those in the first embodiment, the same reference symbols are attached to the corresponding elements, of which descriptions are omitted.

Note that while the ultrasonic sensors of the first and second embodiments each are configured such that a distance of a detection-target object is measured, needless to say that another configuration may also be adopted in which a distance of the detection-target object is not measured but the presence/absence thereof is detected.

Figure 6:
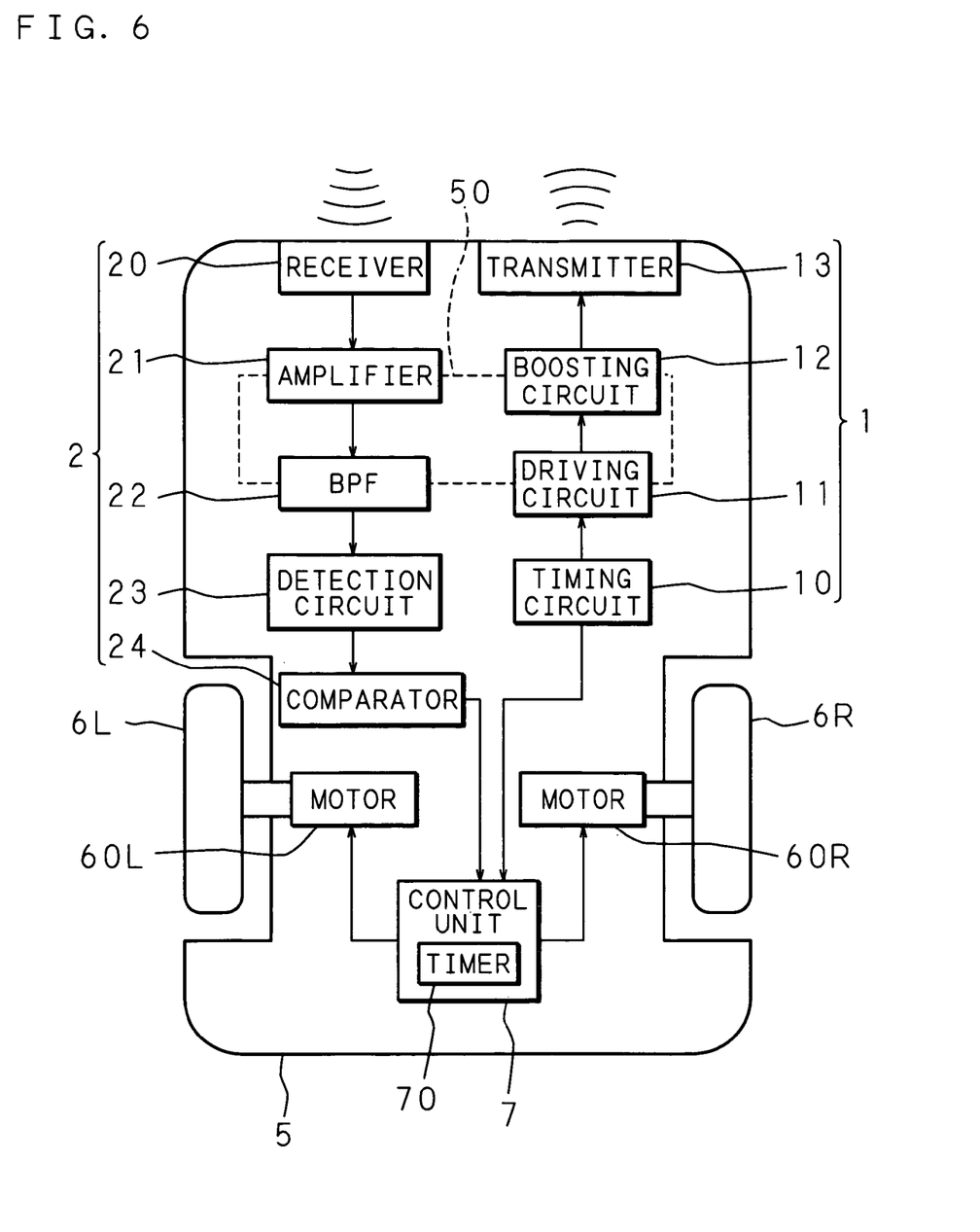
FIG. 6 is a block diagram schematically showing a functional configuration of an autonomous traveling cleaner as one embodiment of the autonomous traveling vehicle according to the invention equipped with the ultrasonic sensor according to the invention.

A practical application of the ultrasonic sensor according to the invention as mentioned above can be mounted, for example, on an autonomous traveling vehicle which travels autonomously. FIG. 6 is a block diagram schematically showing functional configuration of an autonomous traveling cleaner as one embodiment of the autonomous traveling vehicle according to the invention equipped with the ultrasonic sensor according to the invention.

In FIG. 6, numeral 5 denotes a vehicle body having a rectangular parallelepiped shape. Wheels 6R and 6L are freely rotatably arranged on both side surfaces extending in the longitudinal direction (a forward to backward direction) of the vehicle 5 and facing each other. One end of longitudinal direction of the vehicle body 5 is determined as the front side. Accordingly, the vehicle body 5 is configured so as to travel (moves forward) toward one side of the longitudinal direction by rotating the both wheels 6R and 6L together in the positive direction, while to travel (moves backward) toward the another side of the same by rotating the both wheels 6R and 6L together in the reverse direction. In addition, a dust-suction port 50 for sucking dust is provided under the vehicle body 5.

The wheels 6R and 6L are coupled with rotary shafts of respective two motors 60R and 60L disposed within the vehicle body 5. Hence, in a case where the left wheel 6L rotates in the positive direction, while the right wheel 6R rotates in the reverse direction at the same speed of the left wheel 6L, the vehicle body 5 makes a so-called spin turn in a clockwise direction at a position prior to the spin turn without moving either forward or backward, and to the contrary, in a case where the left wheel 6L rotates in the reverse direction, while the right wheel 6R rotates in the positive direction at the same speed of the left wheel 6L, the vehicle body 5 makes a so-called spin turn in a counter-clockwise direction at a position prior to the spin turn without moving either forward or backward.

The motors 60R and 60L are connected to a control unit 7, respectively, and by being driving-controlled of them mentioned above, traveling control and steering control are performed by the control unit 7. The timing circuit 10 and the comparator 24 of the ultrasonic sensor according to the invention are connected to the control unit 7. Hence, a trigger signal as a timing start signal is inputted to the control unit 7 from the timing circuit 10 and, also, a pulse signal as a timing stop signal is inputted to the control unit 7 from the comparator 24. The control unit 7 is equipped with a timer 70 by which an elapsed time till the time when the timing stop signal is inputted from the time when the timing start signal is inputted is measured and in which a distance therefrom to a detection-target object is detected by multiplying the measured time by a propagation velocity of an acoustic wave in air, both of which are similar to those in the ultrasonic sensor according to the invention.

The transmitter 13 of the transmitting apparatus 1 and the receiver 20 of the receiving apparatus 2 are arranged almost on the front of the vehicle body 5 and an acoustic wave transmitted from the transmitter 13 is reflected by the detection-target object located in a direction in which the vehicle body 5 travels forward and received by the receiver 20.

Figure 7A:
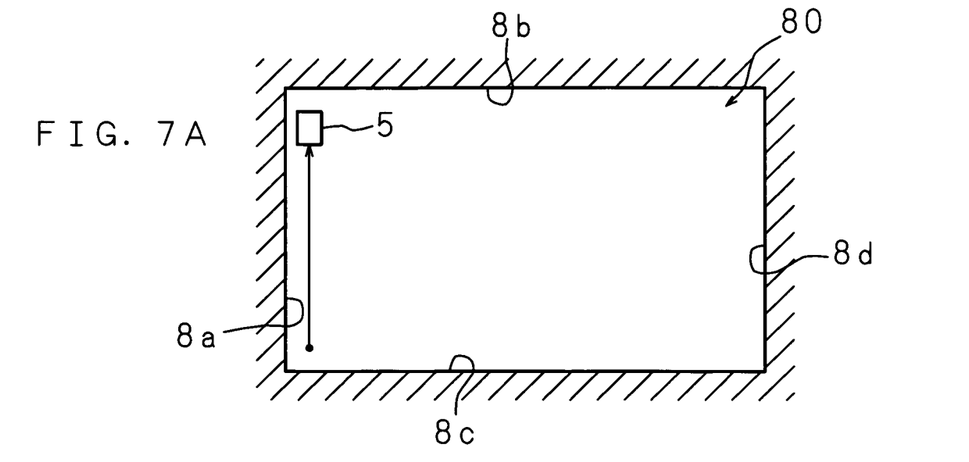
FIG. 7A, FIG. 7B and FIG. 7C are descriptive illustrations showing traveling loci of an autonomous traveling vehicle according to the invention.
Figure 7B:
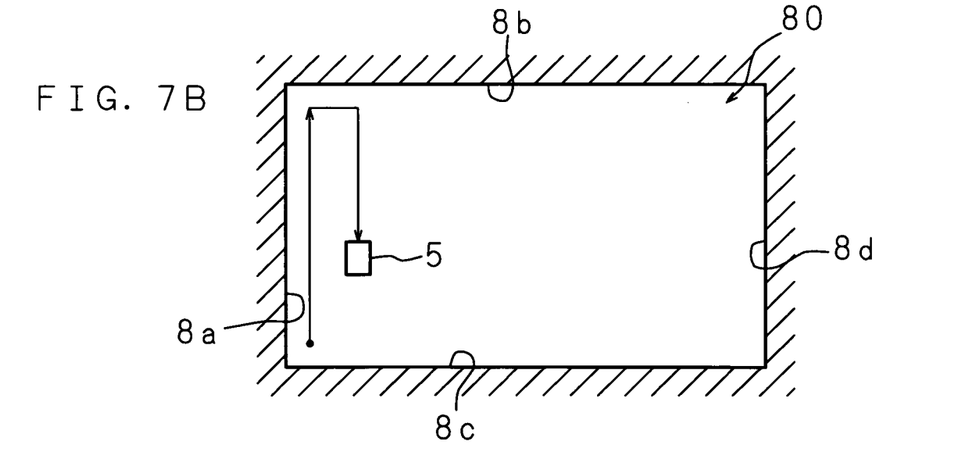
Figure 7C:
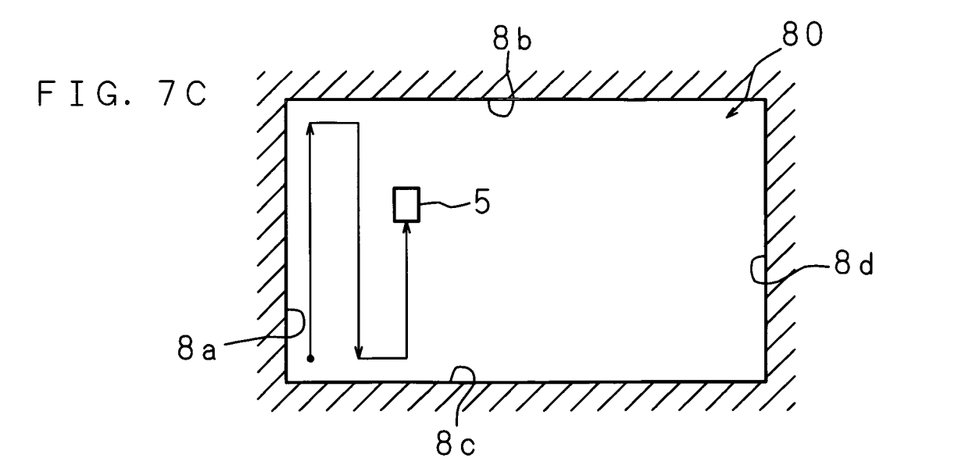

With a configuration described above adopted, the autonomous traveling cleaner autonomously travels about in a rectangular room 80 surrounded by walls 8a, 8b, 8c and 8d as shown in FIG. 7A, FIG. 7B and FIG. 7C. Detailed description will be given below.

The autonomous traveling cleaner, as shown in FIG. 7A, travels straight from one corner of the room 80 (in the bottom left-hand corner in FIG. 7A) along one wall 8a to temporarily stop at a position 2 cm inwardly apart from the wall 8b present in the forward direction thereof. A distance between the autonomous traveling cleaner and the wall 8b in this case is detected by the ultrasonic sensor according to the invention mounted on the autonomous traveling cleaner.

The autonomous traveling cleaner that has temporarily stopped as described above makes a spin turn by 90 degrees in a clockwise direction, as shown in FIG. 7B, at the position where the cleaner temporarily stopped, travels straight (forward) along the wall 8b by a length equal to the width of the vehicle body 5 and thereafter, again stops there. The autonomous traveling cleaner that has again stopped makes a spin turn in a clockwise direction by 90 degrees at the position where the cleaner temporarily stopped again and further travels straight (forward) in parallel to the wall 8a toward the wall 8c facing the wall 8b.

Then, the autonomous traveling cleaner, as shown in FIG. 7C, temporarily stops again at a position in a predetermined length, for example, 2 cm inwardly apart from the wall 8c present in the forward direction thereof, makes a spin turn in a counterclockwise direction by 90 degrees at the position where the cleaner has temporarily stopped. The autonomous traveling cleaner travels straight (forward) along the wall 8c by a length equal to the width of the vehicle body 5, thereafter, again stops there, makes a spin turn in a counterclockwise direction by 90 degrees at the position where the cleaner has again stopped and further travels straight (forward) in parallel to the wall 8a toward the wall 8b facing the wall 8c.

The autonomous traveling cleaner cleans all the floor surface of the room 80 at every part thereof by traveling along and in parallel to the wall 8d in a zigzag pattern in such a way and continuing such traveling to a position where a distance becomes a predetermined distance, for example 2 cm, inwardly apart from the wall 8b or 8c.

Since the autonomous traveling vehicle according to the invention is equipped with the ultrasonic sensor according to the invention and can measure a distance from the walls 8b and 8c while approaching them with high accuracy, the vehicle body 5 can be stopped at a position very close to the walls 8b and 8c. Hence, cleaning can be certainly conducted in portions close to the walls 8a, 8b, 8c and 8d where dust is easily gathered in the room without collision of the vehicle body 5 with the walls 8b and 8c.

While description has been given of the transmitting apparatus 1, the sound sensor and the autonomous traveling vehicle according to the invention above on the basis of the configurations shown in the embodiments, configurations of the transmitting apparatus, the sound sensor and the autonomous traveling vehicle according to the invention are not limited to the configurations shown in the embodiments, and any addition, modification or deletion can also be made within the spirit and scope of the invention.

As this invention may be embodied in several forms without departing from the spirit of essential characteristics thereof, the embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An autonomous traveling vehicle comprising:
a sound sensor, for detecting a detection-target object, including: a transmitting apparatus having a piezoelectric element and a driving circuit for driving said piezoelectric element in a frequency band at which acoustic pressure of an acoustic wave rises steeper than the acoustic pressure when said piezoelectric element is driven at a resonance frequency at which a vibration system including said piezoelectric element resonates the most strongly to transmit an acoustic wave; and a receiving apparatus having a receiver for receiving a reflected wave from said detection-target object of an acoustic wave transmitted from said transmitting apparatus;
a processing circuit for acquiring information on said detection-target object on the basis of an elapsed time till the time when said receiver of said receiving apparatus receives the reflected wave from the time when said transmitting apparatus transmits an acoustic wave; and
a control circuit for performing traveling control and steering control on the basis of information on said detection-target object acquired by said processing circuit.

2. The autonomous traveling vehicle as set forth in claim 1, having a function as a cleaner, wherein said traveling control and steering control by said control circuit is performed so as to travel on routes, in parallel with one pair of walls of a rectangular room facing and in parallel to each other, at predetermined intervals between adjacent routes in a direction along the other pair of walls facing and in parallel to each other, in a zigzag pattern.

* * * * *